(12) United States Patent
Han et al.

(10) Patent No.: US 11,289,751 B2
(45) Date of Patent: Mar. 29, 2022

(54) POUCH-SHAPED BATTERY CASE COMPRISING HEAT DISSIPATION LAYER

(71) Applicant: LG Chem, Ltd., Seoul (KR)

(72) Inventors: Hyung Seok Han, Daejeon (KR); Hyung Kyun Yu, Daejeon (KR); Ki Hoon Paeng, Daejeon (KR); Jae Won Moon, Daejeon (KR)

(73) Assignee: LG Energy Solution, Ltd.

( * ) Notice: Subject to any disclaimer, the term of this patent is extended or adjusted under 35 U.S.C. 154(b) by 123 days.

(21) Appl. No.: 16/478,680

(22) PCT Filed: Jul. 2, 2018

(86) PCT No.: PCT/KR2018/007475
§ 371 (c)(1),
(2) Date: Jul. 17, 2019

(87) PCT Pub. No.: WO2019/059502
PCT Pub. Date: Mar. 28, 2019

(65) Prior Publication Data
US 2020/0280112 A1    Sep. 3, 2020

(30) Foreign Application Priority Data
Sep. 19, 2017 (KR) .......................... 10-2017-0120637

(51) Int. Cl.
*H01M 10/6551* (2014.01)
*H01M 2/02* (2006.01)
(Continued)

(52) U.S. Cl.
CPC ..... *H01M 10/6551* (2015.04); *H01M 10/647* (2015.04); *H01M 50/10* (2021.01); *H01M 50/124* (2021.01)

(58) Field of Classification Search
CPC .......................................... H01M 50/116–131
See application file for complete search history.

(56) References Cited

U.S. PATENT DOCUMENTS

| 6,207,271 B1 * | 3/2001 | Daroux ................ H01M 50/116 428/344 |
|---|---|---|
| 9,899,639 B2 | 2/2018 | Takahagi et al. |

(Continued)

FOREIGN PATENT DOCUMENTS

| CN | 1776934 A | 5/2006 |
|---|---|---|
| CN | 103687721 A | 3/2014 |

(Continued)

OTHER PUBLICATIONS

Extended European Search Report including Written Opinion for Application No. EP18857724.1, dated Apr. 23, 2020, pp. 1-7.

(Continued)

*Primary Examiner* — Stephan J Essex
(74) *Attorney, Agent, or Firm* — Lerner, David, Littenberg, Krumholz & Mentlik, LLP

(57) ABSTRACT

Disclosed herein is a pouch-shaped battery case configured to receive an electrode assembly having a separator interposed between a positive electrode and a negative electrode, the pouch-shaped battery case including an outer coating layer, an inner adhesive layer, and a metal barrier layer disposed between the outer coating layer and the inner adhesive layer, the metal barrier layer including a plurality of metal layers and a heat dissipation layer interposed between the metal layers.

13 Claims, 2 Drawing Sheets

(51) Int. Cl.
*H01M 10/647* (2014.01)
*H01M 50/10* (2021.01)
*H01M 50/124* (2021.01)

(56) References Cited

U.S. PATENT DOCUMENTS

| | | |
|---|---|---|
| 2006/0083984 A1 | 4/2006 | Oh et al. |
| 2013/0034772 A1 | 2/2013 | Koshida et al. |
| 2014/0234689 A1 | 8/2014 | Kim et al. |
| 2016/0172638 A1* | 6/2016 | Amano ............... B32B 27/32 |
| | | 429/185 |
| 2016/0211490 A1 | 7/2016 | Hashimoto et al. |
| 2016/0308174 A1 | 10/2016 | Takahagi et al. |
| 2016/0329533 A1 | 11/2016 | Tajima |
| 2018/0301670 A1* | 10/2018 | Yang ................. B32B 27/36 |

FOREIGN PATENT DOCUMENTS

| | | |
|---|---|---|
| CN | 104681749 A | 6/2015 |
| CN | 204558547 U | 8/2015 |
| CN | 105453299 A | 3/2016 |
| CN | 207256988 U | 4/2018 |
| EP | 2772958 A1 | 9/2014 |
| EP | 3618137 A1 | 3/2020 |
| JP | 2004342564 A | 12/2004 |
| JP | 2005183051 A | 7/2005 |
| JP | 2012203983 A | 10/2012 |
| JP | 2014086361 A | 5/2014 |
| JP | 2014182872 A | 9/2014 |
| JP | 2014527687 A | 10/2014 |
| JP | 2016066546 A | 4/2016 |
| JP | 2016171091 A | 9/2016 |
| JP | 2016213190 A | 12/2016 |
| JP | 2017069203 A | 4/2017 |
| KR | 20130011977 A | 1/2013 |
| KR | 20160096652 A | 8/2016 |
| KR | 20170045800 A | 4/2017 |
| KR | 101779156 B1 | 9/2017 |
| KR | 20170100134 A | 9/2017 |

OTHER PUBLICATIONS

International Search Report for Application No. KR2018/007475 dated Oct. 16, 2018, pp. 1-3.
Search Report from Chinese Application No. 201880008349.6 dated Jul. 13, 2021. 3 pgs.

* cited by examiner

[FIG. 1]
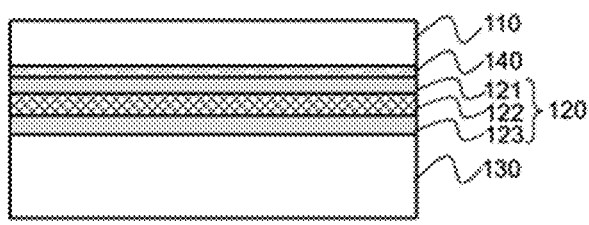
[FIG. 2]
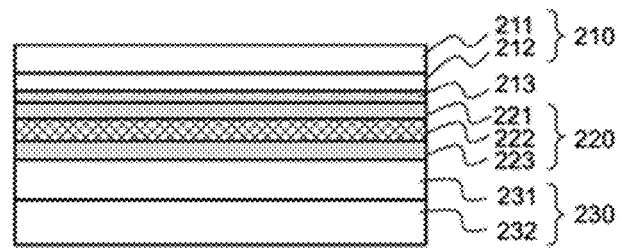

[FIG. 3a]
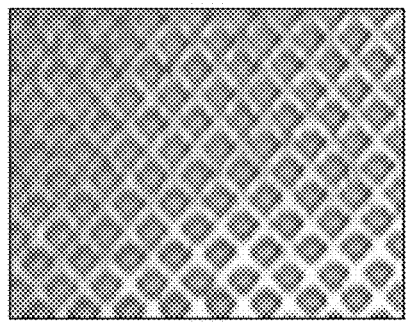
[FIG. 3b]
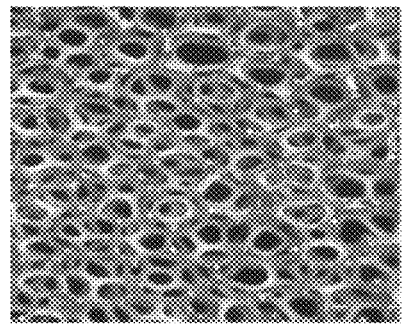
[FIG. 3c]
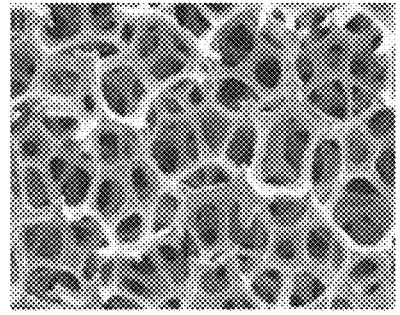
[FIG. 3d]
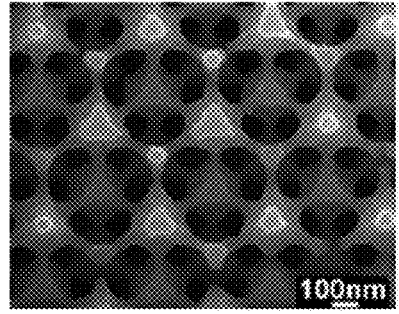

POUCH-SHAPED BATTERY CASE COMPRISING HEAT DISSIPATION LAYER

CROSS-REFERENCE TO RELATED APPLICATIONS

This application is a national phase entry under 35 U.S.C. § 371 of International Patent Application No. PCT/KR2018/007475, filed on Jul. 2, 2018, published in Korean, which claims priority from Korean Patent Application No. 10-2017-0120637, filed on Sep. 19, 2017, the disclosures of which are hereby incorporated herein by reference in their entireties.

TECHNICAL FIELD

The present invention relates to a pouch-shaped battery case including a heat dissipation layer, and more particularly to a pouch-shaped battery case including an outer coating layer, a metal barrier layer, and an inner adhesive layer, wherein the metal barrier layer includes a plurality of metal layers and a heat dissipation layer interposed between the metal layers.

BACKGROUND ART

As mobile devices have been increasingly developed and the demand for such mobile devices has increased, the demand for batteries as energy sources for such mobile devices has also sharply increased. In addition, a lot of research on various kinds of batteries that are capable of satisfying the power requirements of various kinds of devices has been carried out.

In terms of the shape of batteries, the demand for prismatic secondary batteries or pouch-shaped secondary batteries that are thin enough to be applied to products such as cellular phones is very high. In terms of the material for batteries, on the other hand, the demand for lithium secondary batteries, such as lithium ion batteries or lithium ion polymer batteries, which exhibit high energy density, discharge voltage, and output stability, is very high.

In recent years, there has been a lot of interest in a pouch-shaped battery configured to have a structure in which a stacked or stacked/folded type electrode assembly is mounted in a pouch-shaped battery case made of a laminated sheet because of low manufacturing costs, light weight, easy modification of the shape thereof, etc.

A laminated sheet generally includes an outer coating layer, a metal barrier layer, and an inner sealant layer. In the case in which a reception unit for receiving an electrode assembly is formed in the laminate sheet, the outer surface of the metal barrier layer is stretched more than the inner surface of the metal barrier layer, whereby stress is focused on the outer surface of the metal barrier layer and the outer surface of the metal barrier layer cracks. For this reason, it is difficult to form an electrode assembly reception unit having a predetermined depth or more.

In the case in which the battery case cracks, as described above, an electrolytic solution may leak from the battery case, whereby the cycle characteristics of a battery cell may be deteriorated and various problems may occur in the battery cell in terms of the safety of the battery cell.

Even though the metal barrier layer of the laminate sheet is made of a metal, which exhibits high thermal conductivity, the thermal conductivity of the metal barrier layer is reduced by a polymer layer that surrounds the metal barrier layer. As a result, a heat runaway phenomenon may occur in the event of abnormal operation of the battery cell, or the battery cell may explode or may catch fire.

In this connection, Chinese Registered Patent No. 204558547 discloses a lithium battery aluminum film configured to have a layered structure including an outer protective film, a first adhesive layer, an aluminum foil, a second adhesive layer, a porous buffer film, and a heat-sealing film. Since only a single piece of aluminum foil is used together with the porous buffer film, however, it is difficult to obtain a formability improvement effect.

Japanese Patent Application Publication No. 2014-086361 discloses an aluminum foil stack sheet for sheathing a secondary battery, the aluminum foil stack sheet being configured to have a structure in which an aluminum foil A, a modified polyolefin layer B, and a sealant film C are sequentially stacked, wherein at least one selected from among nickel chrome, nickel, silver, platinum, gold, copper, and lead is formed on at least the surface of the aluminum foil A that faces the modified polyolefin layer B in the form of a film having a thickness of 10 to 500 nm.

However, this invention does not include a heat dissipation structure for rapidly discharging heat from a battery cell.

Therefore, there is an urgent necessity for a pouch-shaped battery case configured such that the formability of the pouch-shaped battery case is improved without increasing the thickness of a metal barrier layer included in a laminate sheet for the pouch-shaped battery case and such that the performance of heat discharge from a battery cell is improved.

DISCLOSURE

Technical Problem

The present invention has been made in view of the above problems and other technical problems that have yet to be resolved, and it is an object of the present invention to provide a pouch-shaped battery case including an outer coating layer, a metal barrier layer, and an inner adhesive layer, wherein the metal barrier layer includes a plurality of metal layers and a heat dissipation layer interposed between the metal layers, whereby the formability of the pouch-shaped battery case is improved more than in the case in which a single metal layer is used.

In addition, since heat dissipation characteristics of the pouch-shaped battery case are improved without increasing the overall thickness of the metal barrier layer, it is possible to rapidly discharge heat from a battery cell.

Technical Solution

In accordance with an aspect of the present invention, the above and other objects can be accomplished by the provision of a pouch-shaped battery case configured to receive an electrode assembly having a separator interposed between a positive electrode and a negative electrode, the pouch-shaped battery case including an outer coating layer, an inner adhesive layer, and a metal barrier layer disposed between the outer coating layer and the inner adhesive layer, the metal barrier layer including a plurality of metal layers and a heat dissipation layer interposed between the metal layers.

As described above, the metal barrier layer of the pouch-shaped battery case according to the present invention includes a plurality of metal layers. Compared to a single metal layer having a thickness equal to the sum of the thicknesses of the metal layers, stress generated outside the corners of the battery case at the time of forming the battery case is relatively low. Consequently, it is possible to form an electrode assembly reception unit having a large depth, whereby it is possible to increase the capacity of a battery.

In addition, the battery case is prevented from cracking, whereby it is possible to prevent the leakage of an electrolytic solution from the battery case, to prevent the introduction of foreign matter into the battery case, and to prevent the deterioration of cycle characteristics of the battery.

The heat dissipation layer is disposed between the metal layers. Consequently, it is possible to prevent a reduction in the strength of the battery case due to the relatively small thicknesses of the metal layers. In addition, it is possible to rapidly discharge heat from a battery cell by the provision of the heat dissipation layer.

Consequently, the present invention is capable of solving a conventional problem in which the thermal conductivity of the metal barrier layer is low even though the metal barrier layer is made of a metal, which exhibits high thermal conductivity, due to the presence of a polymer layer that surrounds the metal barrier layer in order to guarantee the insulation and sealing of the battery case.

In a concrete example, the plurality of metal layers may include a first metal layer and a second metal layer, and the first metal layer, the heat dissipation layer, and the second metal layer are sequentially stacked.

The first metal layer and the second metal layer may be made of the same material or different materials. For example, the first metal layer and/or the second metal layer may be made of aluminum.

The heat dissipation layer may be made of the same material as the first metal layer and the second metal layer. Alternatively, the heat dissipation layer may be made of different materials than the first metal layer and the second metal layer.

The heat dissipation layer may define a net structure or a porous structure having openings formed therein, and the openings in the heat dissipation layer may be filled with an adhesive material. The first metal layer and the second metal layer may be attached to opposite surfaces of the heat dissipation layer due to the adhesive material filling the openings formed in the heat dissipation layer.

Consequently, it is not necessary to provide an additional adhesive layer between the first metal layer and the heat dissipation layer or between the second metal layer and the heat dissipation layer.

The adhesive material is not particularly restricted, as long as the coupling between the first metal layer and the heat dissipation layer and the coupling between the second metal layer and the heat dissipation layer can be easily achieved using the adhesive material. For example, the adhesive material may be at least one selected from the group consisting of: a polyester-based resin including polyethylene terephthalate, polybutylene terephthalate, polyethylene naphthalate, polybutylene naphthalate, polyethylene isophthalate, polycarbonate, or copolymer polyester; a polyester-based adhesive; a polyurethane-based adhesive; an epoxy-based resin; a phenol-based resin; nylon 6, nylon 66, or nylon 12; a polyamide-based resin; a polyolefin-based resin including polyolefin, carboxylic acid-modified polyolefin, or metal-modified polyolefin; a polyvinyl-acetate-based resin; a cellulose-based adhesive; a (meth)acryl-based resin; a polyimide-based resin; an amino resin including a urea resin or a melamine resin; rubber including chloroprene rubber, nitrile rubber, or styrene-butadiene rubber; and a silicone-based resin.

In order to rapidly discharge heat from the battery cell such that the occurrence of a heat runaway phenomenon is prevented and the explosion or ignition of the battery cell is prevented, the heat dissipation layer may be made of a material that exhibits a thermal conductivity that is the same as a thermal conductivity of aluminum or a material that exhibits a thermal conductivity that is higher than the thermal conductivity of aluminum. For example, the heat dissipation layer may be made of at least one selected from the group consisting of aluminum (Al), beryllium (Be), copper (Cu), silver (Ag), and gold (Au). Alternatively, the heat dissipation layer may be made of an alloy including two or more of the above-specified metals. The metal may constitute the net structure or the porous structure of the heat dissipation layer.

In a concrete example, in the case in which openings formed in a heat dissipation layer, configured to have a net structure including a plurality of through-holes or a three-dimensional open type porous structure including pores, are filled with the adhesive material, the first metal layer and the second metal layer are coupled to each other via the adhesive material in the heat dissipation layer, whereby the first metal layer and the second metal layer may constitute a single member.

The inner adhesive layer may include a first inner adhesive layer and a second inner adhesive layer. A first surface of the first inner adhesive layer may be located adjacent to the metal layer, and the first inner adhesive layer may be made of acidified polypropylene (PPa). The second inner adhesive layer may be located adjacent to a second surface of the first inner adhesive layer opposite from the first surface, and the second inner adhesive layer may be made of polypropylene (PP).

The outer coating layer may include a first outer coating layer and a second outer coating layer. The first outer coating layer may be an outermost layer of the pouch-shaped battery case, and the first outer coating layer may be made of polyethylene terephthalate (PET). The second outer coating layer may be a layer that is located between the first outer coating layer and the metal layer, and the second outer coating layer may be made of oriented nylon.

In a concrete example, the metal barrier layer may include a plurality of metal layers in order to improve the formability of the metal barrier layer. Specifically, the metal barrier layer may include two or more metal layers.

In addition, heat dissipation layers that are capable of coupling the metal layers to each other while having a predetermined level of strength and that are made of metal materials exhibiting high thermal conductivity may be disposed between the metal layers. That is, the plurality of metal layers may comprise three or more metal layers, the heat dissipation layer may be a first heat dissipation layer, and a plurality of heat dissipation layers including the first heat dissipation layer may be disposed between the three or more metal layers. In this case, the thermal conductivity of each of the heat dissipation layers may be improved, whereby the heat dissipation efficiency of each of the heat dissipation layers may be improved.

An adhesive layer may be interposed between the metal barrier layer and the outer coating layer, and an acidified-polypropylene layer may be coupled to the surface of the metal barrier layer that faces the adhesive layer.

Acidified polypropylene is polypropylene, the surface of which is reformed such that an acidic functional group can be attached thereto. Compared to polypropylene, the force of coupling with the metal barrier layer is further increased.

Preferably, therefore, an inner adhesive layer made of acidified polypropylene is located adjacent to the metal barrier layer.

In accordance with other aspects of the present invention, there are provided a pouch-shaped secondary battery including the pouch-shaped battery case and a battery pack including the pouch-shaped secondary battery.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a vertical sectional view showing a pouch-shaped battery case according to an embodiment of the present invention.

FIG. 2 is a vertical sectional view showing a pouch-shaped battery case according to another embodiment of the present invention.

FIGS. 3a, 3b, 3c, and 3d are views showing various structures, such as a net structure and a porous structure, of a heat dissipation layer.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a side sectional view schematically showing a pouch-shaped battery case according to an embodiment of the present invention.

Referring to FIG. 1, a pouch-shaped battery case 100 is configured to have a structure in which an outer coating layer 110, a metal barrier layer 120, and an inner adhesive layer 130 are sequentially stacked and in which an adhesive layer 140 is disposed between the outer coating layer 110 and the metal barrier layer 120. Although not shown in FIG. 1, the adhesive layer 140 may be disposed between the metal barrier layer 120 and the inner adhesive layer 130. Alternatively, the adhesive layer 140 may be disposed both between the outer coating layer 110 and the metal barrier layer 120 and between the metal barrier layer 120 and the inner adhesive layer 130.

The metal barrier layer 120 is configured to have a structure in which a first metal layer 121, a heat dissipation layer 122, and a second metal layer 123 are stacked. The first metal layer and the second metal layer may be made of the same material or different materials. The heat dissipation layer 122 may be made of the same material as the first metal layer 121 or the second metal layer 123 or a different material than the first metal layer 121 or the second metal layer 123.

The heat dissipation layer 122 has openings formed therein, which will be described later with reference to FIG. 3. The openings formed in the heat dissipation layer 122 are filled with an adhesive material (not shown). When the first metal layer and the second metal layer are coupled to the heat dissipation layer, the first metal layer, the heat dissipation layer, and the second metal layer constitute a single member due to the adhesive material.

FIG. 2 is a side sectional view schematically showing a pouch-shaped battery case according to another embodiment of the present invention.

Referring to FIG. 2, a pouch-shaped battery case 200 is configured to have a structure in which a first outer coating layer 211, a second outer coating layer 212, a metal barrier layer 220, a first inner adhesive layer 231, and a second inner adhesive layer 232 are sequentially stacked and in which an adhesive layer 213 is disposed between the second outer coating layer 212 and the metal barrier layer 220. Although not shown in FIG. 2, the adhesive layer 213 may be disposed between the metal barrier layer 220 and the first inner adhesive layer 231. Alternatively, the adhesive layer 213 may be disposed both between the second outer coating layer 212 and the metal barrier layer 220 and between the first inner adhesive layer 231 and the metal barrier layer 220.

In comparison between the pouch-shaped battery case 100 and the pouch-shaped battery case 200, the pouch-shaped battery case 200 may have the same structure as the pouch-shaped battery case 100 except that the pouch-shaped battery case 200 includes a two-layered outer coating layer and a two-layered inner adhesive layer. Consequently, a description of the pouch-shaped battery case 100 except for the above-described difference may be equally applied to the pouch-shaped battery case 200.

FIGS. 3a, 3b, 3c, and 3d are views showing various structures, such as a net structure and a porous structure, of a heat dissipation layer.

FIG. 3a shows a heat dissipation layer configured to have a net structure including a plurality of through-holes formed in a flat metal sheet, and FIGS. 3b, 3c, and 3d show metal heat dissipation layers configured to have three-dimensional open type porous structures including pores.

The through-holes and the pores are filled with an adhesive material, by which the heat dissipation layers are coupled to metal layers. The adhesive material may fill the through-holes and the pores such that a volume ratio of the adhesive material to the through-holes and the pores ranges from 50% to 100%.

Each of the heat dissipation layers may be made of a material that exhibits high thermal conductivity. In consideration of the fact that a metal layer of a laminate sheet is generally made of aluminum, each of the heat dissipation layers may be made of a metal material that exhibits higher thermal conductivity than aluminum.

Since the pouch-shaped battery case according to the present invention includes a metal barrier layer configured to have a structure in which a heat dissipation layer is interposed between metal layers, as described above, it is possible to improve the formability and heat dissipation efficiency of the pouch-shaped battery case.

Those skilled in the art to which the present invention pertains will appreciate that various applications and modifications are possible based on the above description, without departing from the scope of the present invention.

INDUSTRIAL APPLICABILITY

As is apparent from the above description, the pouch-shaped battery case according to the present invention includes an outer coating layer, a metal barrier layer, and an inner adhesive layer, wherein the metal barrier layer includes a plurality of metal layers. Since each of the metal layers is thinner than a single metal layer having the same thickness, the pouch-shaped battery case may exhibit further improved flexibility, whereby it is possible to improve the formability of the pouch-shaped battery case.

In addition, since a heat dissipation layer is disposed between the metal layers, the heat dissipation efficiency of the pouch-shaped battery case is improved in the state in which the metal layers are coupled to each other via the heat dissipation layer. Consequently, heat dissipation is rapidly achieved before a battery cell is deteriorated, whereby it is possible to provide a secondary battery having improved safety.

The invention claimed is:

1. A pouch-shaped battery case configured to receive an electrode assembly having a separator interposed between a positive electrode and a negative electrode, the pouch-shaped battery case comprising:
   an outer coating layer;
   an inner adhesive layer; and
   a metal barrier layer disposed between the outer coating layer and the inner adhesive layer, the metal barrier layer comprising a plurality of metal layers and a heat dissipation layer interposed between the metal layers, wherein the heat dissipation layer is made of metal and defines a net structure having openings formed therein at regular intervals in an array, and the openings in the heat dissipation layer are filled with an adhesive material.

2. The pouch-shaped battery case according to claim 1, wherein the plurality of metal layers includes a first metal layer and a second metal layer, and wherein the first metal layer, the heat dissipation layer, and the second metal layer are sequentially stacked.

3. The pouch-shaped battery case according to claim 1, wherein the adhesive material is at least one selected from a group consisting of: a polyester-based resin including polyethylene terephthalate, polybutylene terephthalate, polyethylene naphthalate, polybutylene naphthalate, polyethylene isophthalate, polycarbonate, or copolymer polyester; a polyester-based adhesive; a polyurethane-based adhesive; an epoxy-based resin; a phenol-based resin; nylon 6, nylon 66, or nylon 12; a polyamide-based resin; a polyolefin-based resin including polyolefin, carboxylic acid-modified polyolefin, or metal-modified polyolefin; a polyvinyl-acetate-based resin; a cellulose-based adhesive; a (meth)acryl-based resin; a polyimide-based resin; an amino resin including a urea resin or a melamine resin; rubber including chloroprene rubber, nitrile rubber, or styrene-butadiene rubber; and a silicone-based resin.

4. The pouch-shaped battery case according to claim 1, wherein the heat dissipation layer is made of a material that exhibits a thermal conductivity that is the same as a thermal conductivity of aluminum or a material that exhibits a thermal conductivity that is higher than the thermal conductivity of aluminum.

5. The pouch-shaped battery case according to claim 4, wherein the heat dissipation layer is made of at least one selected from a group consisting of: aluminum (Al), beryllium (Be), copper (Cu), silver (Ag), and gold (Au).

6. The pouch-shaped battery case according to claim 2, wherein the first metal layer and the second metal layer are coupled to each other through the heat dissipation layer.

7. The pouch-shaped battery case according to claim 1, wherein the inner adhesive layer comprises a first inner adhesive layer and a second inner adhesive layer.

8. The pouch-shaped battery case according to claim 7, wherein
   a first surface of the first inner adhesive layer is located adjacent to the metal layer, the first inner adhesive layer being made of acidified polypropylene (PPa), and
   the second inner adhesive layer is located adjacent to a second surface of the first inner adhesive layer opposite from the first surface, the second inner adhesive layer being made of polypropylene (PP).

9. The pouch-shaped battery case according to claim 1, wherein the outer coating layer comprises a first outer coating layer and a second outer coating layer.

10. The pouch-shaped battery case according to claim 9, wherein
    the first outer coating layer is an outermost layer of the pouch-shaped battery case, the first outer coating layer being made of polyethylene terephthalate (PET), and
    the second outer coating layer is a layer that is located between the first outer coating layer and the metal layer, the second outer coating layer being made of oriented nylon.

11. The pouch-shaped battery case according to claim 1, wherein the plurality of metal layers comprises three or more metal layers, the heat dissipation layer is a first heat dissipation layer, and a plurality of heat dissipation layers including the first heat dissipation layer are disposed between the three or more metal layers.

12. The pouch-shaped battery case according to claim 1, further comprising:
    an adhesive layer interposed between the metal barrier layer and the outer coating layer, and
    an acidified-polypropylene layer coupled to a surface of the metal barrier layer that faces the adhesive layer.

13. A pouch-shaped secondary battery comprising a pouch-shaped battery case according to claim 1.

* * * * *